Aug. 24, 1943.    C. F. SALTZ    2,327,609
BALANCING ROTATING ELEMENT
Filed Feb. 9, 1942

INVENTOR.
CLARE F. SALTZ
BY T. T. Hicks
HIS ATTORNEY

Patented Aug. 24, 1943

2,327,609

UNITED STATES PATENT OFFICE 2,327,609

BALANCING ROTATING ELEMENT

Clare F. Saltz, Ypsilanti, Mich.

Application February 9, 1942, Serial No. 430,010

6 Claims. (Cl. 51—103)

My invention pertains to an improved method of and means for preparing rotating metallic elements and work pieces for balanced rotation and this invention is, in some respects, an improvement of my invention as disclosed in my copending patent application Serial No. 381,849 filed March 5, 1941.

In the production of rotatable machine parts such as fly-wheels, crank shafts, rotors for electrical machinery, turbines, and the like, it is very important to provide a uniform distribution of the mass around the axis of rotation in order to obtain a balance as nearly perfect as possible in the rotating element. This is especially important in the production of parts to be rotated at high speeds. As is well known, unbalanced machine parts rotating at high speed in fixed bearings absorb a large amount of energy and also cause wear and vibration. Also, when the unbalance is considerable, it is sometimes necessary to change the operating speed to some other speed less suitable for the operation desired. Such unbalance exists when the center of gravity of the rotating part does not coincide with the axis of rotation. But the careful balancing of such parts requires the expenditure of considerable skill and time which adds greatly to the cost of production of such elements.

It has been customary to carefully test the element to determine on which side of the axis it is overbalanced and the magnitude thereof. An attempt is then generally made to remove or to add sufficient metal at a proper location on the element to balance it. This is usually done by a cut-and-try method successively testing the part and removing metal therefrom. I am also aware that various arrangements have been previously provided for automatically removing metal from such an element to balance it in an attempt to simplify this difficult and costly operation.

In accordance with my present invention, material is not removed from the element for the purpose of balancing but, instead, the element is prepared for balanced rotation by removing only sufficient material to form bearing surfaces so located on the element that when the element is mounted to rotate thereon it is balanced to the desired degree of perfection. This involves mounting or supporting the work piece or element in a particular manner for free rotation, applying rotative forces to the element in a particular manner, removing material only to form bearing surfaces while the element is rotating, and the present embodiment of my invention is especially useful for balancing metallic elements.

It is accordingly an object of my invention to provide an improved method of and means for balancing a rotating metallic element by removing metal while the element is rotating and by removing metal only for forming the journalled surfaces.

It is also an object of my invention to provide an improved method of and means for balancing a rotating metallic element by mounting for free spinning rotation the element to be balanced, exposing the element to a rotating magnetic field for rotating the free spinning element at a speed sufficient to cause it to select its axis of rotation and describe a surface of revolution, and simultaneously forming bearing surfaces on the portions of the element which are to be journalled by removing metal therefrom at the points of coincidence of the actual surface of the element with the surface of revolution so that bearing surfaces are formed concentric with the self-selected axis of rotation of the rotating element.

It is a further object of my invention to provide improved apparatus for preparing a rotating metallic element for balanced rotation comprising, means for supporting and guiding the metallic element for free spinning rotary movement to select its axis of balanced rotation in combination with means for producing a rotating magnetic field for rotating the metallic element to be simultaneously engaged by metal removing means for forming suitable surfaces to journal the element in bearings for balanced rotation, without the necessity of having to remove a large quantity of metal from the element for the purpose of balancing it.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing a specific embodiment of my invention, similar reference characters being applied to corresponding elements throughout, and in which.

Figure 1:
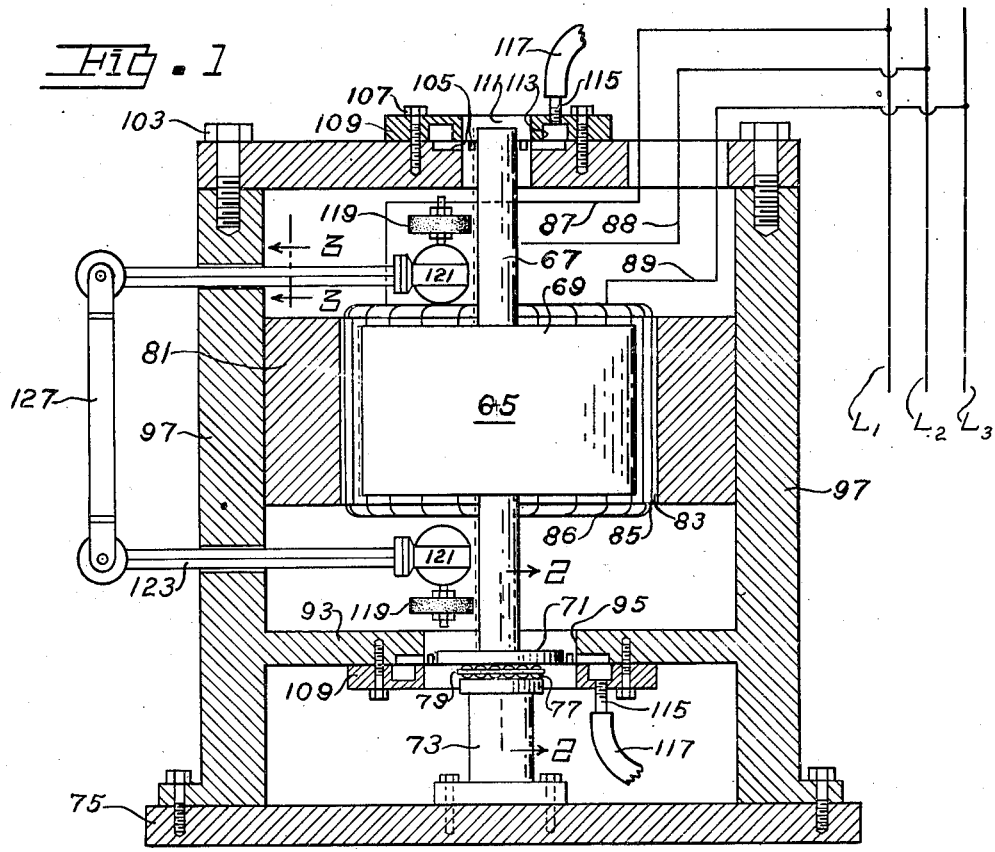
Fig. 1 is a side elevational view, partially sectioned, showing my apparatus for preparing a rotating metallic element for balanced rotation, and schematic circuits.
Figure 2:
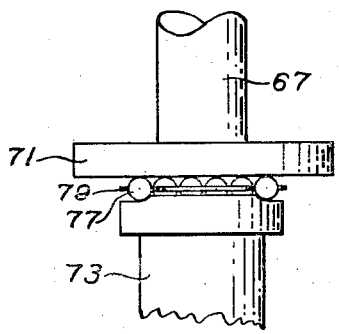
Fig. 2 is an enlarged fragmentary sectional view on line 2—2 of Fig. 1, showing the free bearing support.

Referring more specifically to Figs. 1 and 2 of the drawing, I have illustratively disclosed an embodiment of my apparatus arranged for preparing for balanced rotation a work piece or element 65 which may consist of a shaft 67 having a fly wheel 69 or any intermediate portion of enlarged diameter, secured thereon and which may have a flange 71 projecting laterally from the lower end for some such purpose as attachment to a machine, or for limiting the axial movement of the shaft after the element has been journalled in its ultimate installation. Although this particular element is shown by way of example, it is to be understood that the element to be balanced may take various other forms, such as a rotor for electrical apparatus, by way of examples.

The apparatus comprises a bearing standard 73 rising from a base 75 whereon the apparatus is constructed or assembled. The lower end of the element 65 rests and spins freely upon the upper end of the bearing standard 73 and, to provide a free bearing support, friction reducing ball bearings 77 are preferably provided thereon to reduce the friction to a minimum. The friction reducing balls are confined in a ball-retainer cage 79, in a well-known arrangement, there being several ball bearing assemblies on the market which are suitable for this purpose.

To rotate the metallic element or work piece so that it will spin freely and accurately select its axis of balanced rotation, I provide a stationary field structure 81 which encloses and surrounds the element. The field structure is preferably a laminated construction comprising a plurality of thin steel stampings to reduce losses and heating caused by hysteresis and by eddy currents, in accordance with the usual practice in the design of alternating current electrical equipment. The field structure 81 of my balancing machine may be similar to a conventional induction motor field structure enclosing a substantially cylindrical space surrounding the work piece, as the field structure of an electric motor surrounds the rotor of the motor. The field structure of the balancing machine for any particular installation, is of course selected of a suitable size and shape for accommodating the work pieces which are there to be prepared for balanced rotation.

Slots 83 are provided in the inner surface of the field structure for receiving the turns 85 of a winding 86, of which there are many suitable types, for alternating current energization to set up a rotating electromagnetic field in the usual manner. Such a winding may, for example, comprise a conventional 3-phase winding which may be connected by conductors 87, 88 and 89 for energization from 3-phase service mains L1, L2 and L3.

When the metallic work piece is exposed to such a field, rotative forces are set up by hysteresis and eddy currents, in a well-known manner, and the work piece is caused to rotate so as to freely select its axis of balanced rotation. Even though the element being balanced is of a non-magnetic metal, so that hysteresis is absent, the induced eddy currents set up sufficient rotative forces because it is only necessary to rotate the element spinning freely without delivery of substantial amounts of power, as is necessary in the operation of an electric motor.

With work pieces of various sizes and shapes, different speeds of rotation of the field are desirable to rotate pieces having a small moment of inertia at high speeds and pieces having a large moment of inertia at slower speeds. This factor is taken into consideration in providing a balancing machine to suit the requirements of any particular installation. As in electric motors, different speeds of rotating fields may be obtained by utilizing a small number of field poles for high speeds or a larger number of poles for slower speeds. Also in some locations both 60 cycle and 25 cycle alternating current are available and either may be utilized. If a wide range of speeds is required at any particular location, this requirement may be satisfied by providing a variable speed motor-generator set for energizing the field structure of the balancing machine. In the larger installations, a starter may be provided for applying reduced A. C. voltages to the field windings during starting, as usual with alternating current motors.

Flange 71 on the lower end of the shaft 67 is enclosed in a guide aperture 95 in the structural member 93, the latter being horizontally supported between a pair of vertical side members 95, which may be either spaced brackets in a substantially H formation or side walls of a cylindrical housing. The guide aperture 95 is of a substantially larger diameter than the circular flange disk 71 and serves to approximately predetermine the position of the lower end of the shaft 67 on the free bearing standard 73 while permitting it to rotate freely to select its own centroidal axis of rotation for balanced rotation.

The upper end of the shaft 67 of the element is also similarly confined, within predetermined limits, in a guide aperture 99 in a horizontal top bracket 101. The top bracket 101 is either a beam secured horizontally across the top of the side members 97 as by screws 103 in the ends of these members, or is a disc like cover on a cylindrical housing. The guide aperture 99 is of a larger diameter than the shaft 67 to permit it to move freely therein.

Direct engagement or striking between the shaft 67 and the side walls of the aperture 99 is prevented by projecting streams of air or other fluid thereinto from all sides. This is provided for by cutting in the top surface of the top bracket or wall 101 a plurality of slots 105 which extend radially opening through the side walls toward the center of the aperture 99. Clamped firmly on top of the top member 101 by means of screws 107 is a manifold plate or ring 109 of an annular conformation having a central aperture 111 in alignment with the guide aperture 99. An annular fluid connecting inlet passage 113 in the under side of the manifold plate 109 connects with all the radial slots 105 and supplies the air or other fluid thereto from any suitable pressure source, to which it may be connected through a nipple 115 and hose 117. A tight-sealed joint may be conveniently provided between the manifold ring 109 and the top bracket 101 by inserting any suitable gasket material therebetween, as will be understood.

When the upper end of the shaft 67 of the spinning element approaches the side wall of the guide aperture 99 in any direction, the cylindrical peripheral surface of the shaft closely approaches the cylindrical side wall of the aperture tending to confine or restrict the jets of fluid from an adjacent one of the slots 105 and this applies a force gently guiding the shaft away from the side wall of the aperture. The lower guide aperture 95 may also be similarly provided with a manifold plate 109 projecting fluid throught slots 105 toward the rotating shaft.

As the unbalanced element spins, it rotates on its self-selected centroidal axis about which balanced rotation is obtained, and it describes a surface of revolution larger in diameter than he shaft, in accordance with the amount of unbalanced mass in the element.

All masses under rotation seek to revolve upon an axis passing through the center of mass of the element, but with an unbalanced member rotating on fixed bearings this condition is not attainable so that the state of unbalance continues, causing vibration, power loss and wear. In accordance with my invention the element being prepared for balanced rotation is free to shift and select its own axis of rotation, which it does, and the element then rotates on an axis passing through the center of mass. This self-selected axis of rotation, which I have termed the centroidal axis, is displaced from the geometrical axis by an amount corresponding to the amount of unbalanced mass in the body being balanced, as more fully described in my copending patent application.

In Fig. 1, the element is shown in full lines in its extreme right-hand position and a dotted line represents its extreme left-hand position. New bearing surfaces are cut simultaneously upon all portions of the shaft which are to be journalled. This is accomplished by approaching the shaft 67 with any suitable metal removing means, such as rotating grinding wheels 119 supported and driven by electric motors 121 mounted on the ends of bars 123 which slide through apertures 125 in the side member 97.

Figure 3:
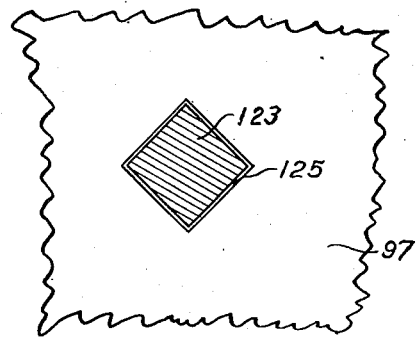
Fig. 3 is an enlarged fragmentary sectional view taken on line 3—3 in Fig. 1, showing how the brackets of the motorized grinders are slidably mounted.

The sliding motor-support bars 123 and the apertures 125 are of a square, or other non-circular cross section, as shown in Fig. 3, so that the shafts of the motors are maintained disposed in suitable vertical or predetermined positions while being moved toward or away from the rotating element. A handle 127 may be provided connected to the two slidable brackets 123 for conveniently moving both of the grinding wheels 119 against the work. As the grinding wheels 119 are at first moved into engagement with the shaft 67, a brief contact is established once during each revolution. As the metal is cut away to form the new bearing surfaces, the period of contact between the grinding wheels and the shaft becomes longer, until finally a smooth but light contact is maintained during the entire rotation. This informs the operator that the operation is completed and that new bearing surfaces have been cut which are concentric with the centroidal axis. Bearing surfaces of any desired length may be cut by selecting grinding wheels 119 of a corresponding axial dimension.

Various elements or work pieces, may be balanced in accordance with the principles of my invention. When balancing electrical rotors, the armature windings or commutator may be conveniently shorted by a symmetrical member, if desired, in order to utilize currents induced therein to produce driving torque. The gyroscopic action of the rapidly rotating work piece resists tilting deflection by engagement with the grinding wheels, and translation is resisted by the fluid cushion. Also the grinding wheels exert but very slight retarding force on the element or may actually be rotated in the same direction but at a higher speed.

It is apparent that within the scope of the invention, modification and different arrangements may be made other than herein disclosed, and the present disclosure is illustrative merely, the invention comprehending variations thereof.

I claim:

1. In combination in apparatus for preparing a metallic element for balanced rotation, means for supporting a metallic element for free spinning movement to freely select an axis of balanced rotation, metal removing means, means movably mounting said metal removing means for movement toward a portion of the spinning element to be journalled for forming bearing surfaces thereon concentric to the self selected axis of rotation, and means for producing a rotating magnetic field around said element for spinning the element freely to select its axis of balanced rotation and to have gyroscopic effect to resist tilting deflection while being engaged by said metal removing means.

2. Apparatus for preparing a metallic element for balanced rotation comprising, friction reducing bearing support means for supporting the lower end of a metallic element spinning thereon in a vertical position, guide means for softly guiding the position of the upper end of the element, an electromagnetic structure for producing a rotating magnetic field around said element to spin the element upon the bearing support for freely selecting its axis of balanced rotation, metal removing means, and means movably mounting said metal removing means for movement toward the portions of the element to be journalled for forming bearing surfaces thereon concentric to the self selected axis of rotation, while the element is spinning.

3. In combination in apparatus for preparing a metallic element for balanced rotation, friction reducing bearing means for supporting the lower end of a metallic element spinning freely, guide means for softly guiding the movements of a spinning element within a predetermined range, means for subjecting a metallic element to a rotating magnetic field to cause the element to rotate and spin freely to accurately select its axis of balanced rotation, metal removing means, and means movably mounting said metal removing means for movement toward the peripheral portions of the element to be journalled to remove metal for forming bearing surfaces thereon concentric with the self selected axis of rotation while the element is spinning.

4. Apparatus for preparing a metallic element for balanced rotation comprising, means for supporting a metallic element for free spinning movement to freely select an axis of balanced rotation, metal removing means, means movably mounting said metal removing means for movement toward a portion of the spinning element to be journalled for forming bearing surfaces thereon concentric to the self selected axis of rotation, a stationary electromagnetic field structure enclosing a space to receive an element to be balanced, an electrically energizable winding on said field structure for producing a rotating magnetic field around said element for spinning the element freely to select its axis of balanced rotation for engagement by said metal removing means to form bearing surfaces on the element.

5. The combination in apparatus for preparing a metallic element for balanced rotation of, a friction reducing bearing support for supporting the lower end of a metallic element spinning thereon in a vertical position, a stationary electromagnetic field structure enclosing a space for a spinning element, an electrically energizable winding for producing a rotating magnetic field around said element to spin said element upon the bearing support for freely selecting its axis of balanced rotation, a grinding wheel, and means movably mounting said grinding wheel for movement toward a portion of the freely spinning element to be journalled for forming bearing surfaces thereon concentric to the self selected axis of rotation.

6. Apparatus for preparing a metallic element for balanced rotation, means for supporting a metallic element for free spinning movement to freely select an axis of balanced rotation, a stationary electromagnetic field structure enclosing a space for a spinning element, a winding electrically energizable for producing a rotating magnetic field around said element for spinning the element freely to select its axis of balanced rotation while being engaged by a metal removing wheel, guide means for softly guiding the position of a spinning element, a metal removing wheel, and means movably mounting said metal removing wheel for movement toward a portion of a spinning element to be journalled for forming bearing surfaces thereon concentric to the self selected axis of rotation.

CLARE F. SALTZ.